United States Patent
Yoon et al.

(10) Patent No.: US 9,676,634 B2
(45) Date of Patent: Jun. 13, 2017

(54) METHOD FOR PRODUCING TITANIUM DIOXIDE PARTICLES COMPRISING COOLING A SOLUTION CONTAINING A STRUCTURE-DIRECTING AGENT, AND TITANIUM DIOXIDE PARTICLES PRODUCED THEREBY

(75) Inventors: Kyung Byung Yoon, Seoul (KR); Hyun Sung Kim, Seoul (KR); Myunpyo Hong, Seoul (KR)

(73) Assignee: INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 1235 days.

(21) Appl. No.: 13/699,843

(22) PCT Filed: May 26, 2011

(86) PCT No.: PCT/KR2011/003854
§ 371 (c)(1),
(2), (4) Date: Nov. 29, 2012

(87) PCT Pub. No.: WO2011/149277
PCT Pub. Date: Dec. 1, 2011

(65) Prior Publication Data
US 2013/0071662 A1 Mar. 21, 2013

(30) Foreign Application Priority Data
May 26, 2010 (KR) .................. 10-2010-0049040

(51) Int. Cl.
*C01G 23/047* (2006.01)
*C01G 23/053* (2006.01)
(Continued)

(52) U.S. Cl.
CPC ............ *C01G 23/053* (2013.01); *C01B 37/00* (2013.01); *C01G 23/047* (2013.01); *C01G 23/08* (2013.01);
(Continued)

(58) Field of Classification Search
CPC .... C01G 13/04; C01G 13/047; C01G 13/053; C01G 13/08
(Continued)

(56) References Cited

U.S. PATENT DOCUMENTS 4,732,750 A 3/1988 Olson et al.
5,718,878 A * 2/1998 Zhang .................... C01B 37/00
106/436
(Continued)

FOREIGN PATENT DOCUMENTS

JP 01-275409 A 11/1989
KR 10-2009-0089693 A 8/2009

OTHER PUBLICATIONS

Chen et al., Surfactant directed self-assembly of size-tunable mesoporous titanium dioxide microspheres and their application in quasi-solid state dye-sensitized solar cells.*
(Continued)

*Primary Examiner* — Holly Le
(74) *Attorney, Agent, or Firm* — Pearne & Gordon LLP

(57) ABSTRACT

The present invention relates to a novel method for producing titanium dioxide particles, and titanium dioxide particles produced thereby, and more specifically, to a novel method for producing titanium dioxide particles capable of producing titanium dioxide particles having uniform particle size through chemical reaction at a temperature equal to or lower than room temperature and can easily control the size of titanium dioxide particles, and titanium dioxide particles produced thereby, having a uniform particle size.

16 Claims, 13 Drawing Sheets

(51) Int. Cl.
*C01G 23/08* (2006.01)
*C01B 37/00* (2006.01)

(52) U.S. Cl.
CPC ...... *C01P 2002/30* (2013.01); *C01P 2004/03* (2013.01); *C01P 2004/32* (2013.01); *C01P 2004/62* (2013.01); *C01P 2006/16* (2013.01); *Y10T 428/2982* (2015.01)

(58) Field of Classification Search
USPC .......................................... 423/610–612, 70
See application file for complete search history.

(56) References Cited

U.S. PATENT DOCUMENTS

| | | | |
|---|---|---|---|
| 6,544,637 B1 * | 4/2003 | Kosuge ................. | B01J 21/063 428/307.3 |
| 8,221,655 B2 * | 7/2012 | Torardi ................. | B82Y 30/00 252/520.22 |
| 2006/0171877 A1 * | 8/2006 | Dadachov ............ | B01J 20/0211 423/610 |

OTHER PUBLICATIONS

Smarsly, et al., "Highly Crystalline Cubic Mesoporous TiO2 with 10-nm Pore Diameter Made with a New Block Copolymer Template", Max Planck Institute of Colloids and Interfaces, Research Campus Golm, Mar. 11, 2004.
Pal, et al., "Size-Controlled Synthesis of Spherical TiO2 Nanoparticles: Morphology, Crystallization, and Phase Transition", Posgrado en Ingenieria y Ciencias Aplicadas, UAEM-CIICAP, Av. Universidad 1001, Col., Chamilpa, Mar. 23, 2006.
International Search Report for PCT/KR2011/003854 dated Feb. 20, 2012.
European Search Report for 11786909.9 dated May 11, 2016.
Chen, et al., "Synthesis of Monodisperse Mesoporous Titania Beads with Controllable Diameter, High Surface Areas, and Variable Pore Diameters (14-23 nm)", Journal of the American Chemical Society, vol. 132, No. 12, Mar. 31, 2010, pp. 4438-4444.
Wang, et al., "Sonochemical Synthesis of Mesoporous Titanium Oxide with Wormhole-like Framework Structures", Advanced Materials, vol. 12, No. 16, Aug. 16, 2000, pp. 1183-1186.

\* cited by examiner

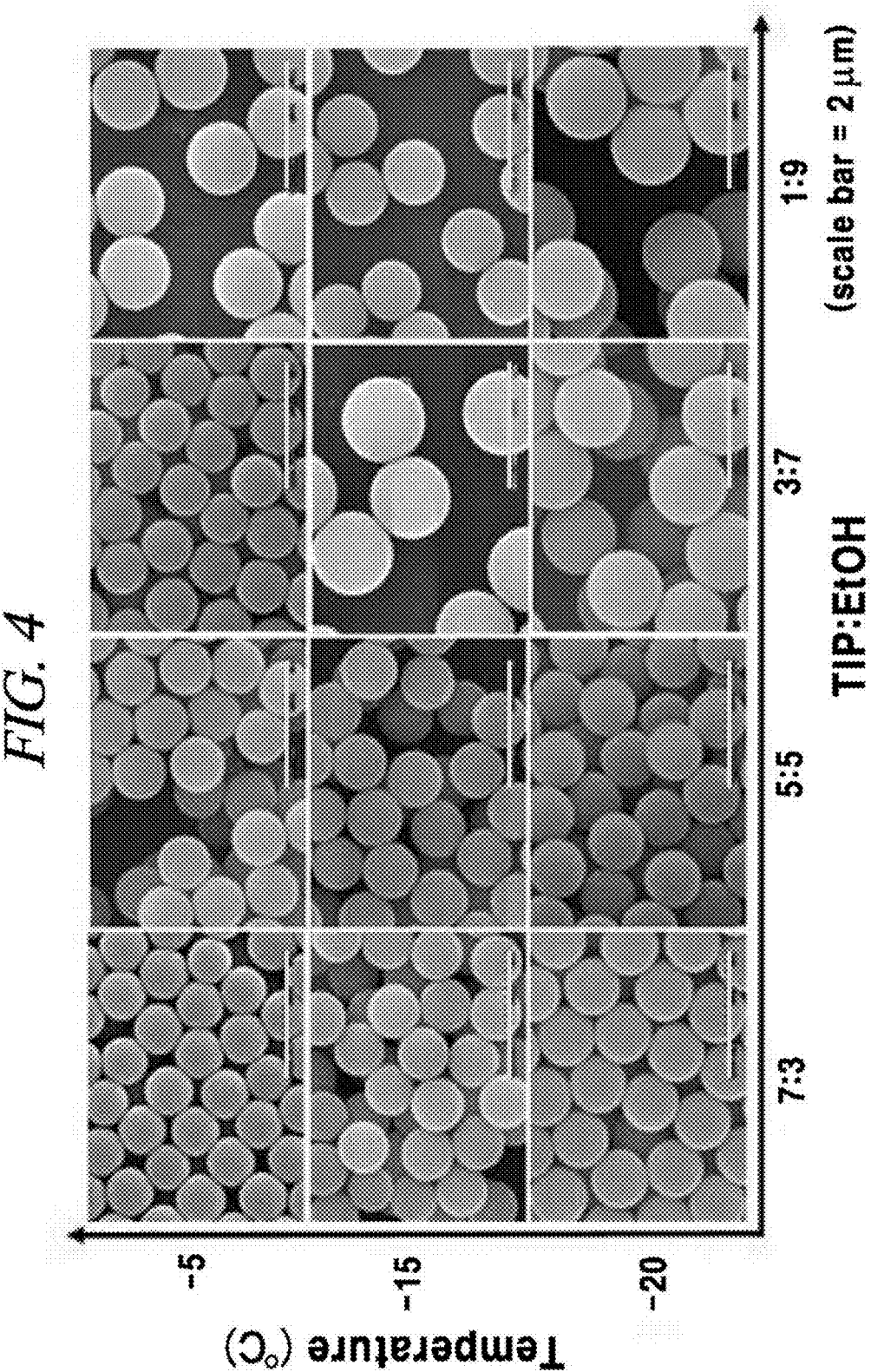

METHOD FOR PRODUCING TITANIUM DIOXIDE PARTICLES COMPRISING COOLING A SOLUTION CONTAINING A STRUCTURE-DIRECTING AGENT, AND TITANIUM DIOXIDE PARTICLES PRODUCED THEREBY

TECHNICAL FIELD

The present disclosure relates to a novel method for producing titanium dioxide particles and titanium dioxide particles produced by this novel method. More particularly, the present disclosure relates to a novel method capable of producing titanium dioxide particles having a uniform size and adjusting sizes of the titanium dioxide particles easily, and also relates to titanium oxide particles having a uniform size produced by this method.

BACKGROUND ART

Titanium dioxide ($TiO_2$) or titanium dioxide particles have a wide variety of applications due to their electromagnetic, catalytic, electrochemical, photochemical characteristics. By way of example, besides pigment, titanium dioxide or titanium dioxide particles may be used as a catalyst, a photocatalyst, a gas sensor, a photoconductor, a solar cell, cosmetics, a coating material, and so forth. Many researches on the applications of titanium dioxide have been conducted.

By way of non-limiting example, since titanium dioxide has an appropriate bonding strength to oxygen and has high acid-resistance, it may be used as an oxidation-reduction catalyst or a carrier. Further, since titanium dioxide itself has high UV protection property, it may be used as a source material for cosmetics or a plastic surface coating material. In addition, by using high refractive index of titanium dioxide, an antireflection coating material capable of preventing light reflection may be manufactured. Furthermore, titanium dioxide may also be applicable to the manufacture of an antimicrobial agent, an anti-pollutant and an ultra hydrophilic coating material.

In addition, since titanium dioxide has a high bandgap, it may be used as a photocatalysit or a photoelectron convertible material capable of converting light energy to electric energy. Further, titanium dioxide may also be used as hydrogen ion conducting material of a secondary battery such as a lithium battery, solid electrolyte or a material for hydrogen storage.

Titanium oxide is known to have three types of crystal structure such as Anatase type, Rutile type and Brookite type. Among these, the Anatase type is reported to exhibit the highest photocatalystic activity. Further, as the particle size is smaller, the condensation state is well controlled, and the specific surface area is larger, the photocatalystic activity of titanium dioxide increases.

Accordingly, if it is possible to mass produce titanium dioxide particles having a uniform size through a simpler process and, also, if it is possible to adjust the sizes of the titanium dioxide particles easily, economic spread effect on various applications such as photocatalyst may be expected.

DISCLOSURE OF THE INVENTION

Problems to be Solved by the Invention

In view of the foregoing, illustrative embodiments provide a novel method capable of mass producing titanium dioxide particles having a uniform size and adjusting the sizes of the titanium dioxide particles easily. Illustrative embodiments also provide titanium dioxide particles produced by this method.

However, the problems sought to be solved by the present disclosure are not limited to the above description and other problems can be clearly understood by those skilled in the art from the following description.

Means for Solving the Problems

In accordance with one aspect of an illustrative embodiment, there is provided a method for producing titanium dioxide particles, including cooling a first solution containing titanium-dioxide precursor and alcohol to a temperature of a room temperature or less; cooling a second solution containing structure-directing agent, alcohol and water to a temperature of the room temperature or less; mixing and reacting the cooled first and second solutions at a temperature of the room temperature or less to thereby produced titanium dioxide particles.

In accordance with another aspect of the illustrative embodiment, there is provided titanium dioxide particles having a uniform size, which is produced by the method for producing titanium dioxide particles.

Effect of the Invention

In accordance with the illustrative embodiment, when producing titanium dioxide particles, the shape, the size and the size distribution of the titanium dioxide particles can be uniformly adjusted. Accordingly, it is possible to easily produce titanium dioxide particles having required shape, size and size distribution in various applications such as, besides pigment, a catalyst, a photocatalyst, a gas sensor, a photoconductor, a solar cell, cosmetics, a coating material, and so forth. Further, since the method for producing titanium dioxide particles can be performed at a temperature of the room temperature or less in a short period of time, the production process may become simpler and production cost can be reduced, as compared to conventional methods of producing titanium dioxide particles by a high-temperature hydrothermal reaction.

BRIEF DESCRIPTION OF THE DRAWINGS

FIG. 4 provide SEM images of titanium dioxide particles produced at various reaction temperatures and various mixing ratios between a titanium-containing precursor and alcohol used in the manufacture of the titanium dioxide particles in accordance with an illustrative embodiment.

BEST MODE FOR CARRYING OUT THE INVENTION

Figure 1:
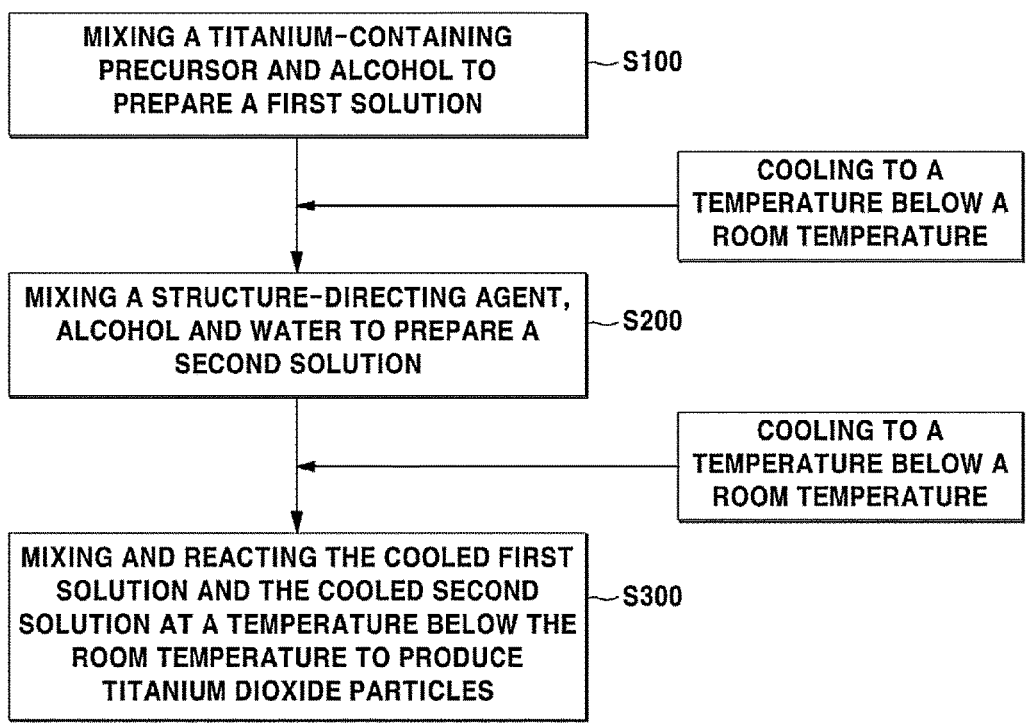
FIG. 1 is a flowchart for describing a method for producing titanium dioxide particles in accordance with an illustrative embodiment.
Figure 2A:
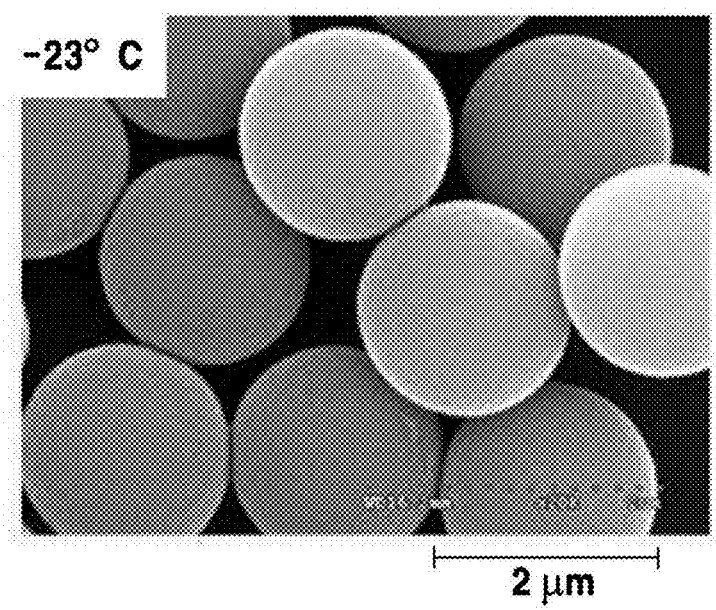
FIGS. 2a to 2f are SEM (Scanning Electron Microscope) images of titanium dioxide particles produced at various reaction temperatures in accordance with an illustrative embodiment.
Figure 2B:
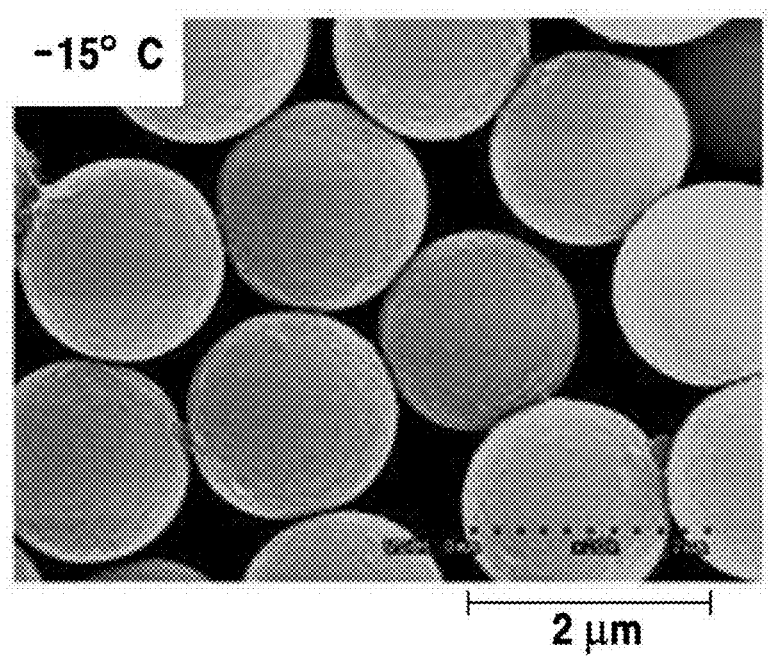
Figure 2C:
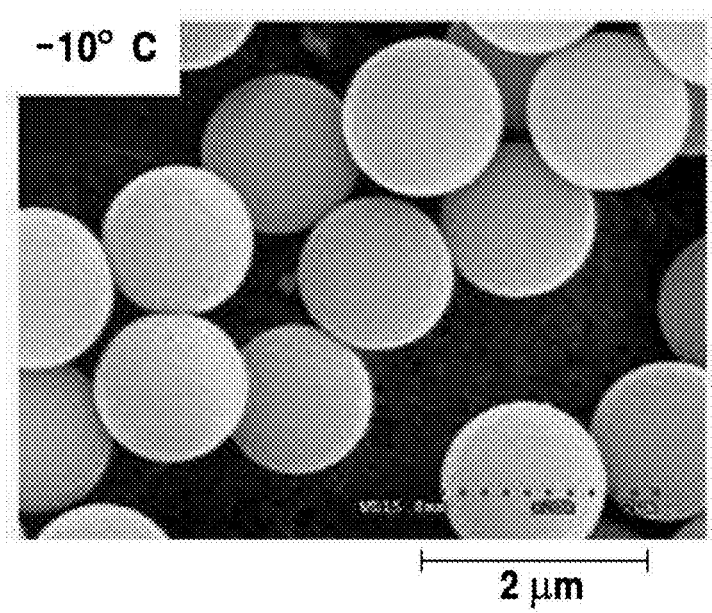
Figure 2D:
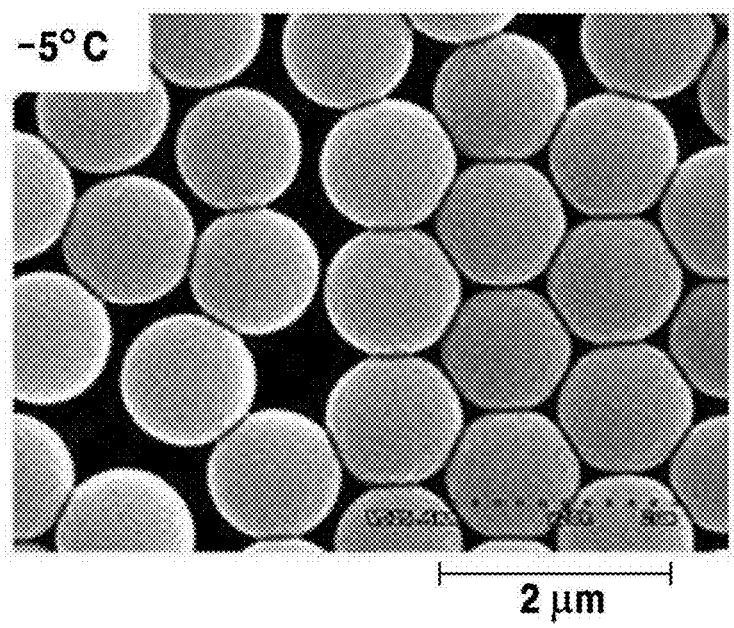
Figure 2E:
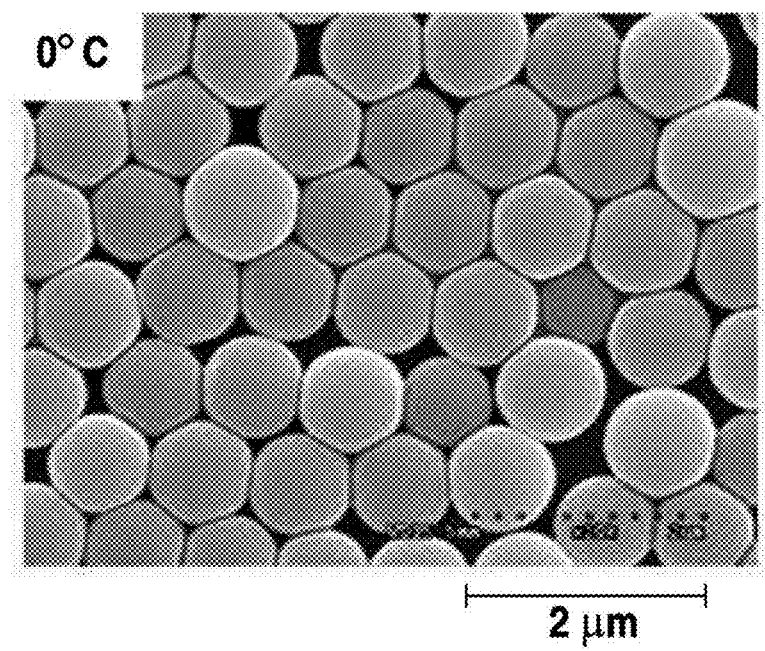
Figure 2F:
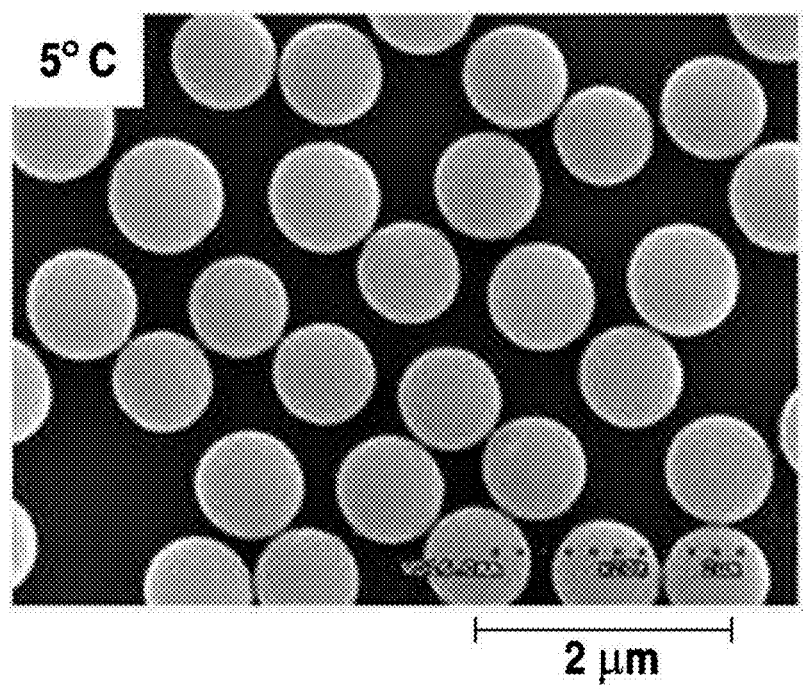

Hereinafter, illustrative embodiments and examples will be described in detail so that inventive concept may be readily implemented by those skilled in the art.

However, it is to be noted that the present disclosure is not limited to the illustrative embodiments and examples but can be realized in various other ways. In drawings, parts not directly relevant to the description are omitted to enhance the clarity of the drawings, and like reference numerals denote like parts through the whole document.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

In accordance with one aspect of the present disclosure, there is provided a method for producing titanium dioxide particles, including: cooling a first solution containing titanium-dioxide precursor and alcohol to a temperature of a room temperature or less; cooling a second solution containing structure-directing agent, alcohol and water to a temperature of the room temperature or less; mixing and reacting the cooled first and second solutions at a temperature of the room temperature or less to thereby produced titanium dioxide particles.

FIG. 1 is a flowchart for describing a method for producing titanium dioxide particles in accordance with an illustrative embodiment. As depicted in FIG. 1, first, a first solution is prepared by mixing a titanium-containing precursor and alcohol at step S100, and, then, the first solution is cooled to a temperature of a room temperature or less. In accordance with an illustrative embodiment, the temperature may be in the range of the room temperature or less, e.g., of about 20° C. or less, of about 10° C. or less, of about 5° C. or less, of about 0° C. or less, of about −5° C. or less, or of about −10° C. or less, but not limited thereto. By way of non-limiting example, the temperature may be in the range from, e.g., about the room temperature to about −30° C., from about the room temperature to about −25° C., from about the room temperature to about −20° C., from about 20° C. to about −30° C., from about 20° C. to about −25° C., from about 20° C. to about −20° C., from about 10° C. to about −30° C., from about 10° C. to about −25° C., from about 10° C. to about −20° C., from about 5° C. to about −30° C., from about 5° C. to about −25° C., from about 5° C. to about −20° C., from about 0° C. to about −30° C., from about 0° C. to about −25° C., from about 0° C. to about −20° C., from about −5° C. to about −30° C., from about −5° C. to about −25° C., or from about −5° C. to about −20° C., but not limited thereto. In accordance with an illustrative embodiment, the first solution may be cooled by being put into a bath set to a temperature of the room temperature or less. By way of example, the bath may be, but not limited to, an ethanol bath.

The titanium-containing precursor may be selected by the person skilled in the art among various known precursors in the relevant art. In accordance with an illustrative embodiment, the titanium-containing precursor may include, but not limited to, a titanium oxide, a titanium salt, or a titanium compound represented by the following Chemical Formula 1.

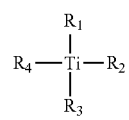

Chemical Formula 1

In Chemical Formula 1, each of $R_1$ to $R_4$ represents independently hydrogen, —OH, a halogen group, an alkyl group of $C_1$ to $C_{22}$, an alkoxy group of $C_1$ to $C_{22}$, an aralkyl group, or an aryl group. Each of $R_1$ to $R_4$ may include independently at least one oxygen, nitrogen, sulfur, or a metal atom.

In accordance with an illustrative embodiment, the titanium-containing precursor may be selected from a group consisting of a titanium oxide, a titanium alkoxide, a titanium salt, and combinations thereof, but not limited thereto. By way of non-limiting example, the titanium alkoxide may be titanium tetramethoxide, titanium tetraethoxide, titanium tetrapropoxide, titanium tetraisopropoxide, titatinum tetrabutoxide, $((CH_3)_2CHO)_2Ti$ $(C_5H_7O_2)_2$ (Diisopropoxytitanium bis(acetylacetonate)), Ti $(C_5H_7O_2)_4$ (titanium tetraacetylacetonate), TDMAT[tetrakis(dimethylamino)titanium], or TDEAT[tetrakis(diethylamino)titanium], but not limited thereto. By way of non-limiting example, the titanium salt may be, but not limited to, titanium halide ($TiX_4$; X represents a halogen such as F, Cl, Br, or I), titanium hydroxide, titanium oxynitride, titanium oxysulfide, titanyl sulfate ($TiOSO_4$).

If necessary, the titanium-containing precursor may be used after purified. By way of example, the titanium-precursor may be used after purified by a vacuum distillation method or the like, but not limited thereto. For example, but not limited, the alcohol may be purified by a distillation after mixed with molecular sieve and then may be used after oxygen and water are removed. Further, for example, the titanium-containing precursor and the alcohol purified as mentioned above may be stored in an inert gas atmosphere such as argon before used. When used, the titanium-containing precursor and the alcohol may be mixed under the inert gas atmosphere to thereby prepare the first solution, but not limited thereto.

In accordance with an illustrative embodiment, the alcohol may have carbon numbers of, e.g., 1 to 6, but not limited thereto. By way of non-limiting example, the alcohol may be methanol, ethanol, n-propyl alcohol, isopropyl alcohol, n-butyl alcohol, isobutyl alcohol, sec-butyl alcohol, pentyl alcohol and its isomer, hexyl alcohol and its isomer, or the like.

In accordance with an illustrative embodiment, in the first solution, the content of the titanium-containing precursor with respect to the alcohol may be about 1 weight %, but not limited thereto. In accordance with an illustrative embodiment, by adjusting the ratio of the titanium-containing precursor and the alcohol in the first solution, the size of the titanium dioxide particles to be produced may be adjusted. By way of example, when reaction temperatures for the production of titanium dioxide particles are same, by increasing the content of the alcohol while varying the ratio (volumetric ratio) between the titanium-containing precursor and the alcohol in the range of about 10:1 to about 1:10, the size of the titanium dioxide particles can be increased.

Then, at step S200, a second solution is prepared by mixing a structure-directing agent, alcohol, and water and the prepared second solution is cooled to a temperature of the room temperature or less. In accordance with an illustrative embodiment, the temperature may be in the range of the room temperature or less, e.g., of about 20° C. or less, of about 30° C. or less, of about 5° C. or less, of about 0° C. or less, of about −5° C. or less, or of about −10° C. or less, but not limited thereto. By way of non-limiting example, the temperature may be in the range from, e.g., about the room temperature to about −30° C., from about the room temperature to about −25° C., from about the room temperature to about −20° C., from about 20° C. to about −30° C., from about 20° C. to about −25° C., from about 20° C. to about −20° C., from about 10° C. to about −30° C., from about 10° C. to about −25° C., from about 10° C. to about −20° C., from about 5° C. to about −30° C., from about 5° C. to about −25° C., from about 5° C. to about −20° C., from about 0° C. to about −30° C., from about 0° C. to about −25° C., from about 0° C. to about −20° C., from about −5° C. to about −30° C., from about −5° C. to about −25° C., or from about −5° C. to about −20° C., but not limited thereto. In accordance with an illustrative embodiment, the second solution may be cooled by being put into a bath set to a temperature of the room temperature or less. By way of example, the bath may be, but not limited to, an ethanol bath.

The structure-directing agent may not be particularly limited, and a typically used one in the art may be employed. By way of example, an organic structure-directing agent may be used. In general, a compound including a nitrogen-containing organic cation may be used. For example, in accordance with an illustrative embodiment, the structure-directing agent may be selected from a group consisting of an alkylamine, an alkanolamine, an alkoxyamine, an ammonium salt represented by the flowing Chemical Formal 2, and combinations thereof, but not limited thereto.

[Chemical Formula 2]

In Chemical Formula 2, each of $R_1$ to $R_4$ represents independently hydrogen, a halogen group, an alkyl group of $C_1$ to $C_{22}$, an alkoxy group of $C_1$ to $C_{22}$, an aralkyl group, or an aryl group. Each of $R_1$ to $R_4$ may include independently at least one oxygen, nitrogen, sulfur, or a metal atom.

Further, $X^-$ denotes a counter anion.

By way of non-limiting example, the counter anion may include a halide anion, a hydroxide anion, a sulfate anion, an acetate anion, and a carboxylate anion, but not limited thereto.

In accordance with an illustrative embodiment, the alkylamine ma include primary alkylamine, secondary alkylamine, and tertiary alkylamine, and the alkyl group included in the alkylamine may be a straight or branched alkyl group having a carbon number ranging from, e.g., about 1 to 20, or about 1 to 12, but not limited thereto.

Through the whole document, unless otherwise defined, the term "alkyl" may include, when used alone or used together with other terms such as "arylalkyl", "alkanolamine", and "alkoxyamine", a linear or branched alkyl group having a carbon number ranging from, e.g., about 1 to 22, about 1 to 20, about 1 to 12, about 1 to 10, or about 1 to 6. By way of example, the alkyl may be methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, or their isomers, but not limited thereto.

Through the whole document, when used along or used as a part of another group, the term "aralkyl" may include an aromatic group bonded through the aforementioned alkyl, i.e., an aryl-substituted alkyl group. By way of non-limiting example, the aralkyl may be an aryl-substituted alkyl group generated as an aryl group adheres to a linear or branched alkyl group having a carbon number ranging from, e.g., about 1 to 22, about 1 to 20, about 1 to 12, about 1 to 10, or about 1 to 6. By way of example, such an aralkyl group may include benzyl, phenylethyl, phenylpropyl, phenylbutyl, phenylpentyl, phenylhexyl, biphehylmethyl, biphenylethyl, biphenylpropyl, biphenylbutyl, biphenylpentyl, biphenylhexyl, and naphthyl, but not limited thereto.

Through the whole document, when used along or used as a part of another group, the term "aryl" may include not only a monocyclic or bicyclic aromatic group such as penyl or substituted penyl but also a bonded group such as naphtyl, phenanthrenyl, idenyl, tetrahydronaphthyl, and indanyl, but not limited thereto. Accordingly, the aryl group may include at least one group having six or more atoms and may include five or less groups having twenty-two or less atoms. Further, between the adjacent carbon atoms or appropriate hetero atoms, double binding may exist alternately (resonance). The aryl group may be substituted with one or more groups selected from, but not limited to, halogen such as F, Br, Cl, or I; alkyl such as methyl, ethyl, or propyl; or alkoxy such as methoxy, ethoxy, hydroxy, carboxy, carbamoyl, alkyloxcarbonyl, nitro, alkenyloxy, trifluoromethyl, amino, cycloalkyl, aryl, heteroaryl, cyano, alkyl-S(O)m (m=O, 1, 2) or thiol.

In relevant to the above Chemical formulas 1 and 2, through the whole document, the term "halogen" implies chlorine, bromine, fluorine, or iodine.

By way of non-limiting example, the structure-directing agent may be an aliphatic amine, or a cycloaliphatic amine including eight or less carbon atoms. To be more specific, the structure-directing agent may be, but not limited to, propylamine, isopropylamine, isobutylamine, n-butylamine, piperidine, 4-methylpiperidine, cyclopentylamine, cyclohexylamine, 1,1,3,3-tetramethyl-butylamine, cyclopentylamine, diisobutylamine, trimethylamine, diisopropylamine, sec-butylamine, 2,5-dimethylpyrrolidine, 2,6-dimethylpyrrolidine, or the like.

In accordance with an illustrative embodiment, the alcohol used at step S200 may have carbon numbers ranging from 1 to 6, but not limited thereto. By way of non-litming example, the alcohol may be methanol, ethanol, n-propyl alcohol, isopropyl alcohol, n-butyl alcohol, isobutyl alcohol, sec-butyl alcohol, pentyl alcohol and its isomer, hexyl alcohol and its isomer, or the like.

Subsequently, at step S300, the first solution and the second solution cooled to the temperature of the room temperature or less may be mixed and made to react with each other at a temperature of the room temperature or less. As a result, titanium dioxide particles are produced.

The produced titanium dioxide particles have a uniform particle size, and it is possible to adjust the size of the titanium dioxide particles by controlling the reaction temperature. In accordance with an illustrative embodiment, the reaction temperature may be in the range of the room temperature or less, e.g., of about 20° C. or less, of about 10° C. or less, of about 5° C. or less, of about 0° C. or less, of about −5° C. or less, or of about −10° C. or less, but not limited thereto. By way of non-limiting example, the temperature may be in the range from, e.g., about the room temperature to about −30° C., from about the room temperature to about −25° C., from about the room temperature to about −20° C., from about 20° C. to about −30° C., from about 20° C. to about −25° C., from about 20° C. to about −20° C., from about 10° C. to about −30° C., from about 10° C. to about −25° C., from about 10° C. to about −20° C., from about 5° C. to about −30° C., from about 5° C. to about −25° C., from about 5° C. to about −20° C., from about 0° C. to about −30° C., from about 0° C. to about −25° C., from about 0° C. to about −20° C., from about −5° C. to about −30° C., from about −5° C. to about −25° C., or from about −5° C. to about −20° C., but not limited thereto. In accordance with an illustrative embodiment, the first solution and the second solution may be stored and cooled in baths set to temperature of the room temperatures or less. Then, by mixing first and second solutions at a temperature of the room temperature or less, the first and second solutions are allow to react with each other while stirring.

In accordance with an illustrative embodiment, as the reaction temperature decreases, the size of the produced titanium dioxide particles may be increased. Accordingly, by adjusting the reaction temperature for forming the titanium dioxide particles within the temperature range of the room temperature or less, the size of the produced titanium dioxide particles may be easily adjusted. Moreover, the physical property of the titanium dioxide particles may be easily controlled, so that it becomes possible to produce titanium dioxide particles having particle size in the order of nanometer or micrometer.

In accordance with an illustrative embodiment, a hydrothermal reaction of the mixed solution of the first and second solutions reacted at the temperature of the room temperature or less may be further included, but not limited thereto. Through the hydrothermal reaction, the crystallinity of the produced titanium dioxide particles may be improved. The hydrothermal reaction may be performed by using a reactor and under temperature and pressure conditions that have been typically used in the art. By way of example, the hydrothermal reaction may be performed at a temperature higher than, e.g., about 50° C. or about 100° C. by using a high-pressure reactor such as autoclave, but not limited thereto.

In accordance with an illustrative embodiment, the method for producing the titanium dioxide particles in accordance with the present disclosure may additionally include a process of, but not limited to, obtaining titanium dioxide particles by filtering the mixed solution of the first and second solutions after returning the temperature of the mixed solution of the first and second solutions to the room temperature once reacted at the temperature of the room temperature or less. The filtered titanium dioxide particles may be cleaned by a solvent such as water or alcohol and then dried by using an oven or other typically known methods.

In accordance with an illustrative embodiment, the method for producing the titanium dioxide particles may further include a process of crystallizing the obtained titanium dioxide particles by performing calcinations of the titanium dioxide particles, but not limited thereto. By way of example, the temperature for the calcinations may be equal to or higher than, e.g., about 400° C., but not limited thereto.

In accordance with an illustrative embodiment, the titanium dioxide particle produced as above may have a uniform particle size, but not limited thereto. By way of example, the titanium dioxide particles may have the uniform size in the range equal to or higher than, e.g., about 10 nm, about 100 nm, about 1 µm or about 10 µm, but not limited thereto. By way of non-limiting example, the titanium dioxide particles may have the uniform size in the range from, e.g., about 10 nm to about 1 µm, about 10 nm to about 10 µm, about 10 nm to about 100 µm, about 100 nm to about 1 µm, about 100 nm to about 10 µm, about 100 nm to about 100 µm, about 1 µm to about 10 µm or about 1 µm to about 100 µm, or in the range equal to or larger than about 1 µm or about 10 µm. As for the size (diameter) of the titanium dioxide particles, the average size thereof can be calculated by several measurement methods. Parameters such as a mode diameter indicating a maximum value of distribution, a median diameter corresponding to a median of an integral frequency distribution curve and various average diameters (number average, length average, area average, weight average, etc.) may be frequently used. In the present disclosure, unless otherwise defined, the diameter of the titanium dioxide particles implies a number average diameter. Further, in the preset disclosure, unless particularly mentioned, a ratio (Mv/Mn) of a volume average diameter (Mv) to a number average diameter (Mn) may be used as a measure of the uniformity of the size of the titanium dioxide particles (i.e., mono-dispersion of the particles having a uniform size). The ration Mv/Mn of the titanium dioxide particles in accordance with the illustrative embodiments may be set to be in the range from, e.g., about 1.0 to about 2.0, about 1.0 to about 1.8, about 1.0 to about 1.5, about 1.0 to about 1.3 or about 1.0 to about 1.1, or may be about 1.0.

In accordance with an illustrative embodiment, the produced titanium dioxide particles may have mesopores, but not limited thereto. By way of example, the size of the mesopores may be in the range from, e.g., about 1 nm to about 100 nm, but not limited thereto. Such mesopores may be generated as a result of using the structure-directing agent as mentioned above. Depending on the kind of the structure-directing agent, the size and/or shape of the mesopores formed within the titanium dioxide particles may be adjusted.

In accordance with an illustrative embodiment, the produced titanium dioxide particles may have a spherical shape, but not limited thereto. By way example, the titanium dioxide particles may have a spherical bead shape.

In accordance with an illustrative embodiment, the size of the produced titanium dioxide particles may be adjusted depending on the ratio between the titanium-containing precursor and the water or the ratio between the titanium-containing precursor and the structure-directing agent used in the production of the titanium dioxide particles, but not limited thereto. In accordance with an illustrative embodiment, by increasing the ratio (volumetric ratio) between the titanium-containing precursor and the water in the range of, e.g., about 1:1 to about 1:10, the size of the produced titanium dioxide particles can be reduced.

In accordance with another aspect of the present disclosure, there is provided titanium dioxide particles having a uniform size produced by the above-described production method. The size and the shape of the titanium dioxide particles can be adjusted by controlling the cooling temperatures of the first and second solutions and/or the reaction temperature, and/or by controlling the content ratio between the titanium-containing precursor and the alcohol. Such control of the titanium dioxide particles are the same as described above for the explanation of the method for producing the titanium dioxide particles, and redundant description will be omitted for the simplicity of explanation.

In accordance with an illustrative embodiment, the produced titanium dioxide particles may have a uniform size, but not limited thereto. By way of example, the titanium dioxide particles may have the uniform size in the range equal to or higher than, e.g., about 10 nm, about 100 nm, about 1 μm or about 10 μm, but not limited thereto. By way of non-limiting example, the titanium dioxide particles may have the uniform size in the range from, e.g., about 10 nm to about 1 μm, about 10 nm to about 10 μm, about 10 nm to about 100 μm, about 100 nm to about 1 μm, about 100 nm to about 10 μm, about 100 nm to about 100 μm, about 1 μm to about 10 μm or about 1 μm to about 100 μm, or in the range equal to or larger than about 1 μm or about 10 μm, but not limited thereto.

In accordance with an illustrative embodiment, the produced titanium dioxide particles may have a uniform size and a spherical shape, but not limited thereto.

In accordance with an illustrative embodiment, the produced titanium dioxide particles may have mesopores, but not limited thereto. By way of example, the size of the mesopores may be in the range from, e.g., about 1 nm to about 100 nm, but not limited thereto. Such mesopores may be generated as a result of using the structure-directing agent as mentioned above. Depending on the kind of the structure-directing agent, the size and/or shape of the mesopores formed within the titanium dioxide particles may be adjusted.

In accordance with the illustrative embodiments as described above, titanium dioxide particles having a uniform size can be mass produced through a simpler process and the size of the titanium dioxide particles can be easily adjusted. Thus, economic spread effect on various applications such as photocatalyst may be expected.

Hereinafter, examples will be explained in detail, but the illustrative embodiments are not limited thereto.

EXAMPLES

1. Preparation of Ti-Containing Precursor for Synthesizing Titanium Dioxide Particles After purifying titaniumisopropoxide (TIP, produced by Acros Co.) by a vacuum distillation method, the titaniumisopropoxide was moved into a sealed Schlenk flask under argon atmosphere. By mixing ethanol with dried molecular sieve (4A) and distilling the mixture under argon atmosphere, oxygen and water were removed. Then, the ethanol was moved into the sealed Schlenk flask. Thereafter, the titaniumisopropoxide and the ethanol thus prepared were put into a glove box, and the titaniumisopropoxide and the ethanol of the argon atmosphere were mixed at a volumetric ratio of about 2:3 in a vial, so that a first solution was prepared.

2. Synthesis of Titanium Dioxide Particles (1) Production of Titanium Dioxide Particles Depending on Variation in Synthetic Temperature Ethanol (about 20 ml), dodecylamine (about 0.16 g) and water (about 0.16 g) were mixed in a round bottom flask of, e.g., about 25 ml. Then, the round bottom flask was put into an ethanol bath set to a certain temperature (e.g., a room temperature, about 5° C., about 0° C., about −5° C., about −10° C., about −15° C., and about −23° C., respectively), and left therein until the temperature of the solution within the round bottom flask falls down to the certain set temperature. The above process was performed under the argon atmosphere. The vial storing the mixed solution of titaniumisopropoxide-ethanol taken out of the glove box was also submerged in the ethanol bath and set to the certain set temperature. When the temperature of the solution within the round bottom flask becomes equal to the set temperature of the ethanol bath, about 1.1 ml of TIP-ethanol solution was added into the round bottom flask. Then, the TIP-ethanol solution and the solution in the round bottom flask were made to react with each other while stirring for about 20 minutes. Afterward, the mixture was move to the room temperature and the temperature of the mixture was returned back to the room temperature. Then, the reacted solution was filtered and cleaned by ethanol three times, and then dried in an oven of, e.g., about 60° C. Then, the dried titanium dioxide particles were ground and calcinated at about 500° C. for about 2 hours to thereby eliminate residual organic materials and obtain Anatase type spherical crystalline titanium dioxide particles having a uniform size (FIGS. 2a to 2f, and FIG. 3).

(2) Production of Titanium Dioxide Particles Depending on Variation in Ratio Between Titanium-Containing Precursor (TIP) and Alcohol The same method as employed in (1) was used excepting that the reaction temperature was set to, e.g., about −5° C., −15° C., −20° C., respectively. Titanium dioxide particles were synthesized while varying the ratio (volumetric ratio) between the TIP and the alcohol (ethanol) to about 7:3, about 5:5, about 3:7 and about 1:9, respectively. Then, the sizes of the produced titanium dioxide particles were compared (FIG. 4).

(3) Production of Titanium Dioxide Particles Depending on Variation in Synthetic Temperature The same method as employed in (1) was used excepting that the ratio (volumetric ratio) between the TIP and the water was varied to about 2:x (x=1.5, 3, 6, 9). Titanium dioxide particles were synthesized while varying the ratio between the TIP and the water in this range, and the sizes of the produced titanium dioxide particles were compared (FIGS. 5a to 5d).

3. Analysis of Titanium Dioxide Particles

The titanium dioxide particles produced as described above were found to have a uniform shape and sizes equal to or larger than, e.g., about 0.5 μm. The produced titanium dioxide particles having the uniform sizes were observed with a SEM (Scanning Electron Microscope) (FIGS. 2a to 2f, and FIG. 3).

Figure 3:
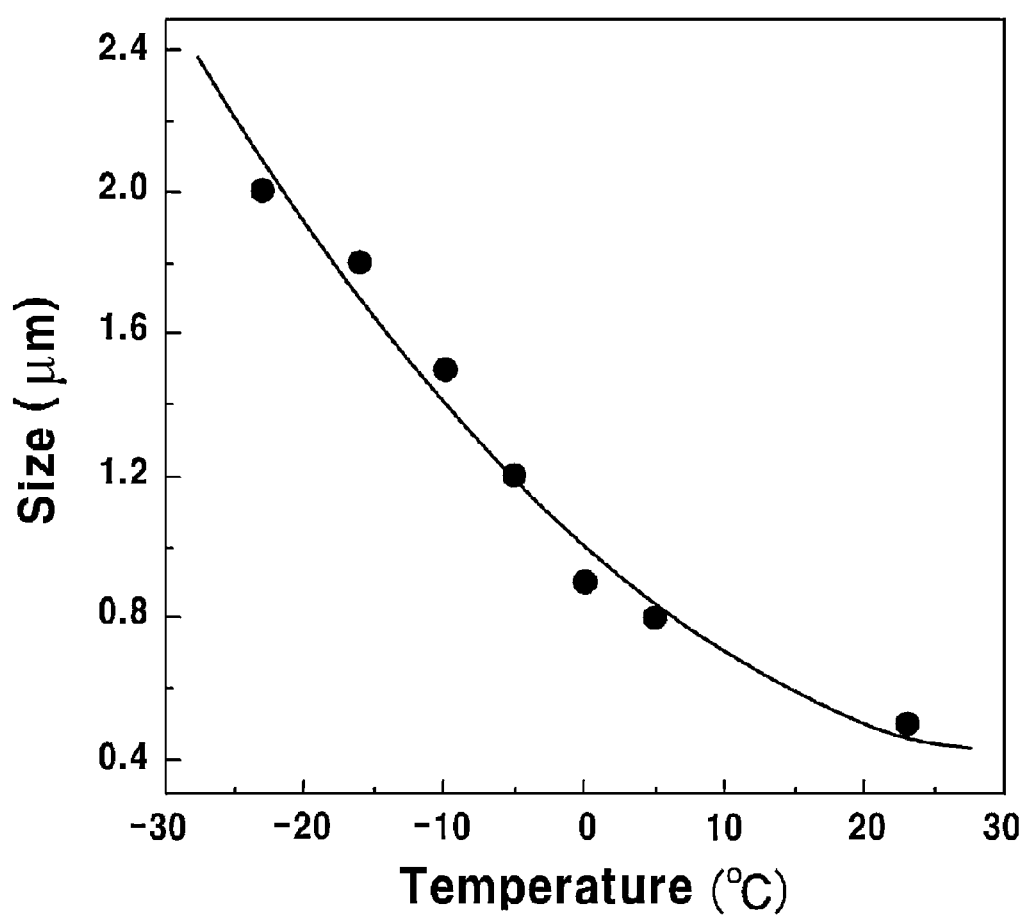
FIG. 3 is a graph showing a variation in size of titanium dioxide particles produced at various reaction temperatures in accordance with an illustrative embodiment.
Figure 5A:
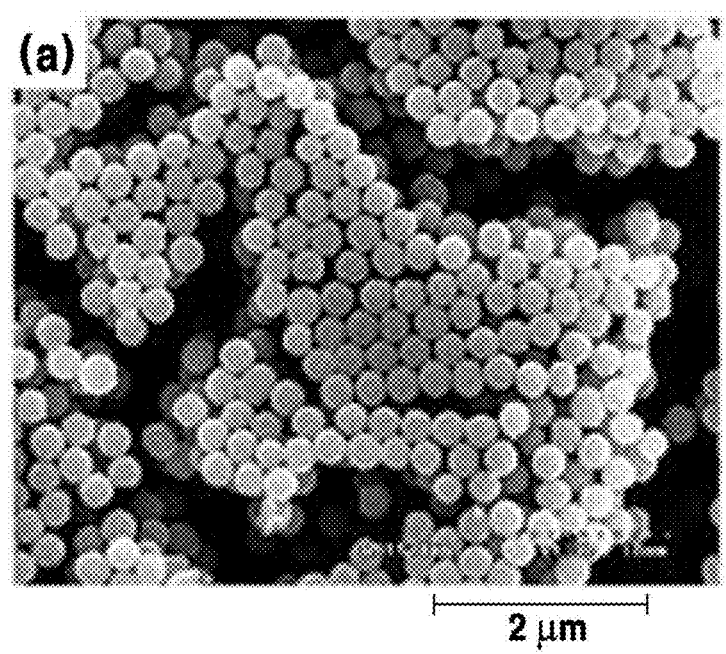
FIGS. 5a to 5d are SEM images of titanium dioxide particles produced at various mixing ratios between a titanium-containing precursor and water used in the manufacture of the titanium dioxide particles in accordance with an illustrative embodiment.
Figure 5B:
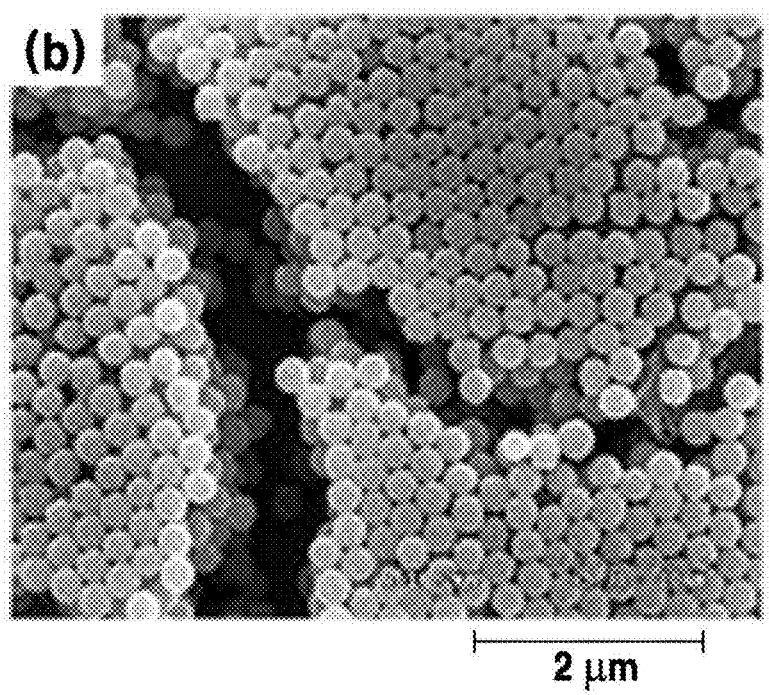
Figure 5C:
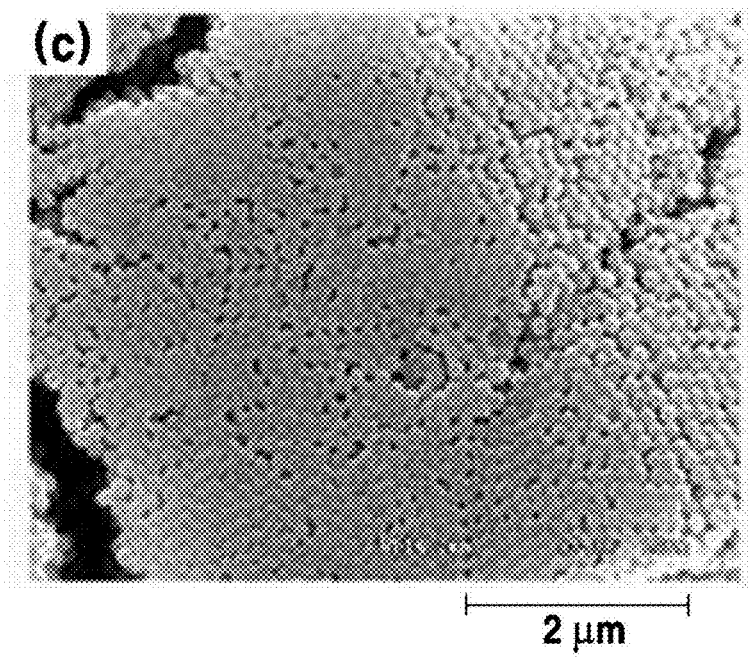
Figure 5D:
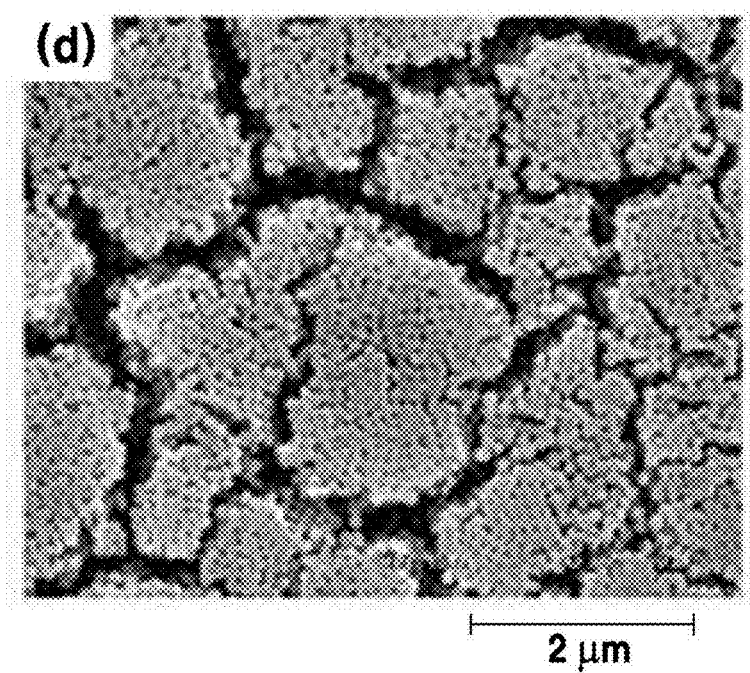

As can be seen from the images of FIGS. 2a to 2f and the graph of FIG. 3, the size of the produced titanium dioxide particles was found to increase as the reaction temperature (set temperature of the ethanol bath) was decreased to about the room temperature, about 5° C., about 0° C., about −5° C., about −10° C., about −15° C., and about −23° C., respectively Further, when the reaction temperature for the production of the titanium dioxide particles was same, the size of the produced titanium dioxide particles was found to increase as the content of the alcohol was increased by varying the ratio (volumetric ratio) between the TIP and the alcohol to about 7:3, about 5:5, about 3:7, and about 1:9, respectively (FIG. 4).

Furthermore, as depicted in FIGS. 5a to 5d, the size of the produced titanium dioxide particles was found to decrease as the content of the water was increased by varying the ratio between the TIP and the water to about 2:x (x=about 1.5 (a), about 3(b), about 6(c), and about 9, respectively (d)) (FIGS. 5a to 5d).

Through the above examples, it was proved that by adjusting the reaction temperature of the room temperature or less, titanium dioxide particles having a uniform size can be mass produced easily and, also, the size of the titanium dioxide particles can be easily adjusted. Moreover, by adjusting the ratio between the titanium-containing precursor and the alcohol and/or the ratio between the titanium-containing precursor and the water, the size of the produced titanium dioxide particles can be easily adjusted.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A method for producing titanium dioxide particles, comprising:
   cooling a first solution containing titanium containing precursor and a first alcohol to a temperature of a room temperature or less;
   cooling a second solution containing structure-directing agent, a second alcohol and water to a temperature of the room temperature or less;
   mixing and reacting the cooled first and second solutions at a temperature of the room temperature or less to thereby produce titanium dioxide particles.

2. The method of claim 1,
   wherein the produced titanium dioxide particles have a uniform size.

3. The method of claim 1,
   wherein the produced titanium dioxide particles have a spherical shape.

4. The method of claim 1,
   wherein the produced titanium dioxide particles have mesopores.

5. The method of claim 4,
   wherein the size of the mesopores ranges from 1 nm to 100 nm.

6. The method of claim 1,
   wherein the size of the produced titanium dioxide particles is equal to or larger than 100 nm.

7. The method of claim 1,
   wherein the size of the produced titanium dioxide particles is equal to or larger than 1 μm.

8. The method of claim 1,
   wherein the size of the produced titanium dioxide particles is adjusted by controlling at least one of the cooling temperature of the first solution, the cooling temperature of the second solution, and the reaction temperature.

9. The method of claim 1,
   Wherein the size of the produced titanium dioxide particles is adjusted by controlling a ratio between the titanium-containing precursor and the first alcohol.

10. The method of claim 1,
    wherein the titanium-containing precursor may include a titanium dioxide, a titanium salt, or a titanium compound represented by the following Chemical Formula 1:

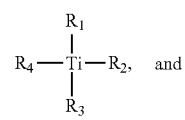

[Chemical Formula 1]

in the Chemical Formula 1, each of $R_1$ to $R_4$ represents independently hydrogen, —OH, a halogen group, an alkyl group of $C_1$ to $C_{22}$, an alkoxy group of $C_1$ to $C_{22}$, an aralkyl group, or an aryl group and each of $R_1$ to $R_4$ includes independently at least one oxygen, nitrogen, sulfur, or a metal atom.

11. The method of claim 10,
    wherein the titanium-containing precursor is selected from a group consisting of a titanium oxide, a titanium alkoxide, a titanium salt, and combinations thereof.

12. The method of claim 1,
    wherein the first and second alcohols have a carbon number of 1 to 6.

13. The method of claim 1,
    wherein the structure-directing agent is selected from a group consisting of an alkylamine, an alkanolamine, an alkoxyamine, an ammonium salt represented by the flowing Chemical Formal 2, and combinations thereof:

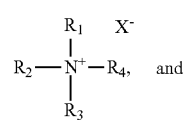

[Chemical Formula 2]

in the Chemical Formula 2, each of $R_1$ to $R_4$ represents independently hydrogen, a halogen group, an alkyl group of $C_1$ to $C_{22}$, an alkoxy group of $C_1$ to $C_{22}$, an aralkyl group, or an aryl group; each of $R_1$ to $R_4$ includes independently at least one oxygen, nitrogen, sulfur, or a metal atom; and $X^-$ denotes a counter anion.

14. The method of claim 13,
    wherein the alkylamine includes primary alkylamine, secondary alkylamine and tertiary alkylamine,
    the alkanolamine includes primary alkanolamine, secondary alkanolamine and tertiary alkanolamine,
    the alkoxyamine includes primary alkoxyamine, secondary alkoxyamine and tertiary alkoxyamine,
    the alkyl group or alkylene group included in the alkylamine, the alkanolamine and the alkoxyamine is a straight or branched alkyl group or alkylene group having a carbon number ranging from 1 to 20.

15. The method of claim 1, further comprising:
    obtaining titanium dioxide particles by filtering the mixed solution of the first and second solutions reacted at the room temperature or less.

16. The method of claim 15, further comprising:
    crystallizing the obtained titanium dioxide particles through a hydrothermal reaction or a calcination.

* * * * *